United States Patent
Knoop et al.

(10) Patent No.: US 8,918,273 B2
(45) Date of Patent: Dec. 23, 2014

(54) METHOD FOR DETERMINING AN EVASION TRAJECTORY FOR A MOTOR VEHICLE, AND SAFETY DEVICE OR SAFETY SYSTEM

(71) Applicants: Michael Knoop, Ludwigsburg (DE); Thomas Haeussler, Kuenzelsau-Vogelsberg (DE)

(72) Inventors: Michael Knoop, Ludwigsburg (DE); Thomas Haeussler, Kuenzelsau-Vogelsberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/016,970

(22) Filed: Sep. 3, 2013

(65) Prior Publication Data
US 2014/0067252 A1    Mar. 6, 2014

(30) Foreign Application Priority Data
Sep. 3, 2012    (DE) .................. 10 2012 215 562

(51) Int. Cl.
| | | |
|---|---|---|
| *B60W 30/06* | (2006.01) | |
| *B60W 10/20* | (2006.01) | |
| *G08G 1/16* | (2006.01) | |
| *B60W 10/184* | (2012.01) | |
| *B60W 30/09* | (2012.01) | |

(52) U.S. Cl.
CPC .............. *G08G 1/167* (2013.01); *B60W 30/06* (2013.01); *B60W 10/20* (2013.01); *B60W 10/184* (2013.01); *B60W 30/09* (2013.01)
USPC .......................................................... 701/301

(58) Field of Classification Search
None
See application file for complete search history.

(56) References Cited

U.S. PATENT DOCUMENTS

| | | | | |
|---|---|---|---|---|
| 2007/0027597 | A1* | 2/2007 | Breuel et al. | 701/41 |
| 2009/0037052 | A1* | 2/2009 | Ogasawara et al. | 701/41 |
| 2010/0228427 | A1* | 9/2010 | Anderson et al. | 701/29 |
| 2010/0235035 | A1* | 9/2010 | Nishira et al. | 701/29 |
| 2013/0054128 | A1* | 2/2013 | Moshchuk et al. | 701/301 |

FOREIGN PATENT DOCUMENTS

| | | |
|---|---|---|
| DE | 196 50 475 | 4/1998 |
| DE | 10 2010 028 384 | 11/2010 |
| DE | 10 2010 042 048 | 4/2012 |
| EP | 970875 | 1/2000 |
| EP | 1735187 | 12/2006 |
| WO | WO 2010/127994 | 11/2010 |

* cited by examiner

*Primary Examiner* — John R Olszewski
*Assistant Examiner* — Jess Whittington
(74) *Attorney, Agent, or Firm* — Kenyon & Kenyon LLP

(57) ABSTRACT

A method for determination of an optimized evasion trajectory by a safety device or a safety system, in particular a lane change assistance system and/or evasion assistance system, of a motor vehicle, the optimized evasion trajectory being outputted to a vehicle driver, and/or a trajectory of the motor vehicle being optionally partially adapted to the optimized evasion trajectory, by way of the method, the optimized evasion trajectory being determined by optimization of a transverse-dynamic quality factor (J), for which a transverse acceleration (a) and/or a transverse jerk (à) of the motor vehicle is/are utilized. Also described is a safety device or a safety system, in particular to a lane change assistance system and/or an evasion assistance system for a motor vehicle, a method being executable and/or being executed by the safety device or the safety system.

14 Claims, 3 Drawing Sheets

METHOD FOR DETERMINING AN EVASION TRAJECTORY FOR A MOTOR VEHICLE, AND SAFETY DEVICE OR SAFETY SYSTEM

FIELD OF THE INVENTION

The invention relates to a method for determination of an optimized evasion trajectory by a safety device or a safety system, in particular a lane change assistance system and/or evasion assistance system, of a motor vehicle. The invention further relates to a safety device and/or a safety system, in particular to a lane change assistance system and/or an evasion assistance system for a motor vehicle, and to a use of a method according to the present invention, of a safety device according to the present invention, or of a safety system according to the present invention.

BACKGROUND INFORMATION

Active safety is one of the main focal points in the development of present as well as future motor vehicle systems. Known safety systems or driver-assistance systems in the area of the active safety of motor vehicle occupants, i.e. in order to avoid accidents involving the motor vehicle in question, are, for example, the electronic stability program (ESP) for stabilizing the motor vehicle by way of a braking intervention in the dynamic limit region, as well as vehicle dynamic management (VDM) as an extension of ESP using additional steering interventions. One known safety device of such a safety system is, for example, a lane change assistance system or evasion assistance system for the motor vehicle.

It is important to note, when designing such safety devices and the safety systems at a higher order above them, that average motor vehicle drivers often have problems in dangerous situations evading an obstacle by suitable steering maneuvers. It is found in driver training sessions, for example, that steering input by the average motor vehicle driver occurs too late, too quickly or slowly, too much or too little, or not at all, and moreover that a countersteering action, e.g. in the context of a double lane change (i.e. back to the original lane) is performed incorrectly or not at all. This leads either to a collision with an obstacle or to instabilities, and in serious cases causes the motor vehicle to skid. A plurality of driver assistance systems (DAS) or advanced driver assistance systems (ADAS) therefore exist as additional electronic or mechatronic devices in motor vehicles to assist the vehicle driver in critical driving situations.

EP 970 875 A2 teaches a safety system for motor vehicles with which, based on data from distance sensors, a steering actuation suite of a steer-by-wire system of a motor vehicle can be influenced in such a way that a motor vehicle driver can at least be prevented from establishing a steering angle that leads to a collision. The safety system can, in this context, optionally automatically establish an evasion course. With this safety system, a decision as to whether, when, and in what direction evasion occurs is made by the safety system and taken away from the motor vehicle driver. No determination of an evasion trajectory occurs, however, except for a defined steering angle for the evasion course.

EP 1 735 187 B2 discloses a safety system for motor vehicles having a steering device and a braking device, a risk of collision with an obstacle in front of the motor vehicle being sensed and evaluated by the safety system for evasion assistance in emergency situations of the motor vehicle. This is accomplished on the basis of internal information about the motor vehicle and external information based on sensors, etc. If a risk of a collision by the motor vehicle is high, a steering assistance action by the safety system is initiated as soon as the vehicle driver begins an evasive maneuver or an excessively tentative evasive maneuver. For this, an evasion trajectory is calculated and is conveyed to the vehicle driver in the form of a steering torque, a haptic signal, or an exertable additional steering angle. The evasion trajectory specified by the safety system can be overridden by the motor vehicle driver. A criterion or optimization criteria for the evasion trajectory is not disclosed.

SUMMARY

An object of the invention is to describe an improved method for determining an evasion trajectory for a lane change assistance system and/or evasion assistance system for motor vehicles. The intention is to be able to reliably prevent, by way of a determined or calculated evasion trajectory, a risk of collision between the motor vehicle and an obstacle, in which context a motor vehicle driver is to retain control over a steering behavior of the motor vehicle. In addition, proceeding from the existing art, a safety device, a safety system, and the method of the kind recited previously are to be further developed in such a way that an evasive maneuver initiated by the motor vehicle driver or by the motor vehicle itself is to be perfected.

The object of the invention is achieved by a method for determination of a target trajectory or an optimized evasion trajectory by a safety device or by a safety system, in particular by a driver assistance system such as e.g. a lane change assistance system and/or evasion assistance system, of a motor vehicle, according to Claim 1; by a safety device or a safety system, in particular a lane change assistance system and/or evasion assistance system for a motor vehicle, according to Claim 9; and by a use of a method according to the present invention, a safety device according to the present invention, or a safety system according to the present invention, according to Claim 10. Advantageous refinements, additional features, and/or advantages of the invention are evident from the dependent claims and the description that follows.

In the method according to the present invention an optionally current (cyclic procedure) or optimized evasion trajectory is outputted to a vehicle driver, and/or a trajectory of the motor vehicle is optionally partially adapted to the target trajectory or to the optimized evasion trajectory, the target trajectory or the optimized evasion trajectory being determined by optimization of a transverse-dynamic quality factor, for which preferably a transverse acceleration and/or a transverse jerk of the motor vehicle is utilized. What is discussed below is substantially only an optimized evasion trajectory; the term "target trajectory" is intended to be subsumed by the term "optimized evasion trajectory."

In the method according to the present invention, the transverse-dynamic quality factors are determined preferably for a family of evasion trajectories, the optimized evasion trajectory being characterized by a minimum, in particular by a global minimum, of the determined transverse-dynamic quality factors. According to the invention, a path-dependent weighting in the transverse-dynamic quality factor can be performed for a shift forward and/or backward in time of a beginning of an optimized evasion trajectory or a beginning of an actual evasive maneuver, an exponential weighting in the transverse-dynamic quality factor preferably occurring by way of a parameter.

The method according to the present invention can be carried out using a mathematical approximation solution, an optimized solution being developed preferably formally in a Taylor series, in particular a second-order Taylor series. In addition, in the method the weighting parameter can be adjusted as a function of a coefficient of friction between a tire/roadway system, such that the optimized evasion trajectory can be shifted back in time for a comparatively low coefficient of friction and shifted forward in time for a comparatively high coefficient of friction. In the method, the weighting parameter can furthermore be adjusted as a function of a time until a potential collision. The time until the potential collision is preferably ascertained here from a distance to an obstacle and from a differential speed between the motor vehicle and the obstacle.

To carry out a correction intervention for evasion assistance one time after initiation, the following steps, for example, can be utilized. Firstly a position parameter of the motor vehicle is determined, and subsequently the weighting parameter is adapted to the coefficient of friction and/or to the time until a potential collision. Subsequently thereto in time, a calculation of the optimized evasion trajectory can occur. To carry out a correction intervention for evasion assistance cyclically until an end of the maneuver, the following steps, for example, can be utilized. Firstly a current vehicle position is determined, and subsequently thereto in time a calculation of a target position of the motor vehicle is made from the evasion trajectory or from the current evasion trajectory; subsequently thereto, a correction yaw torque is determined which is converted into a control application variable for the motor vehicle.

DETAILED DESCRIPTION

Figure 1:
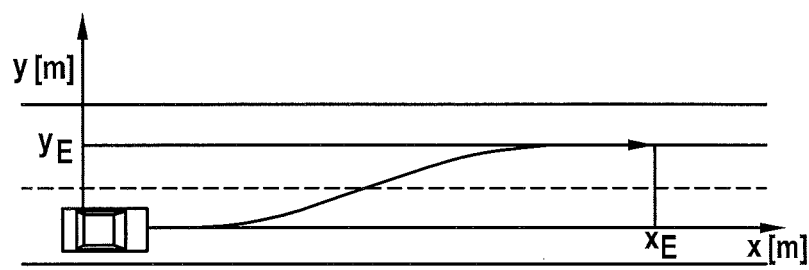
FIG. 1 is a two-dimensional schematic plan view of a lane change maneuver or evasive maneuver of a motor vehicle on a two-lane street or roadway.

The invention will be explained in more detail below with reference to an evasive maneuver of a motor vehicle in the context of a distance $x_E$ to be covered in the direction of travel, and a distance $y_E$ to be covered in a direction perpendicular to the direction of travel (see FIG. 1). This corresponds to a lane change maneuver of the motor vehicle as a result of an obstacle, e.g. a vehicle (not depicted), located farther ahead with respect to the motor vehicle. The invention is of course not limited to such an embodiment, but instead can be applied to a plurality of other driving maneuvers of the motor vehicle or of motor vehicles.

It is thus possible, for example, to apply the invention not only to comparatively simple lane change maneuvers, but also to evasive maneuvers of the motor vehicle, comparatively little time being available therefor and rapid and decisive action on the part of the vehicle driver and of a driver assistance system, for example a safety device or a safety system, in particular a lane change assistance system and/or evasion assistance system, being necessary. It is further possible to transfer the invention to moving obstacles, for example when overtaking a vehicle or encountering a crossing pedestrian or bicyclist, or in the case of obstacles that arise suddenly.

For this, a target trajectory or an optimized or optimal lane-change or evasion trajectory will be selected below from a family of lane-change or evasion trajectories on the basis of a quality factor J or quality criterion J according to the present invention. This specification deals substantially only with "optimized" and "evasion trajectory," and the terms "optimal" and "target/lane-change trajectory" are intended to be subsumed by the former terms. The term "optimized" is further intended to refer to a possible better evasion trajectory, the optimized evasion trajectory being selected from the family of evasion trajectories on the basis of the quality factor J. This optimized evasion trajectory does not necessarily represent the one optimum evasion trajectory, especially since the quality factor J can also be defined differently.

The optimized evasion trajectory is then that trajectory which is selected by the driver assistance system and is proposed to the motor vehicle driver for an imminent evasive maneuver. In other words, the vehicle is intended to imminently drive this evasion trajectory. The driver assistance system can also be set up in such a way that it at least temporarily imposes the optimized evasion trajectory on the motor vehicle driver, although this is suitable only for emergencies that have been detected with considerable probability (e.g. the motor vehicle driver signals this). The driver assistance system can optionally be designed in such a way that the motor vehicle driver cannot fall short of the evasion trajectory but can exceed it.

A driver assistance system of this kind, i.e. a safety device or a safety system that can also be referred to as an anti-collision device or anti-collision system, respectively, can be a substantially electronic device or a substantially electronic system that makes use of the conventional mechanical devices and control elements of the motor vehicle. It is furthermore possible to equip such a device or such a system additionally with mechanical devices and control elements. One such device or system is disclosed in EP 1 735 187 B2, the disclosure content of which is expressly intended to be incorporated here. For calculation of an optimized evasion trajectory or for the calculation of evasion trajectories, firstly an obstacle must be detected. This can be done, for example, in accordance with EP 1 735 187 B2 (see the following paragraph along with paragraphs [0029] and [0030] of EP 1 735 187 B2).

In a first step, internal and external conditions, namely parameters and a surroundings of a motor vehicle, are sensed. To implement this function, the safety system has a sensing unit for surroundings sensing; this sensing unit operates inter alia on a radar-sensor and/or video-sensor basis. In addition, in the context of the sensing unit data and information about the road being traveled are additionally sensed using further sensors, for example data and information regarding the number and width of the lanes and regarding the position of the own vehicle and a potential collision adversary relative to the lanes. Data and information of a digital map, e.g. of a navigation system, are also incorporated into the surroundings sensing. Vehicle communication, vehicle-infrastructure communication, and data of the own motor vehicle are also possible as further information sources (see also calculation module 26 of EP 1 735 187 B2).

In the context of a lane change or an evasive maneuver, the motor vehicle is intended to modify its trajectory transversely to its original direction of motion. The evasion trajectory is preferably described in terms of terrestrial coordinates, as a functional depiction y(x) (see FIG. 1). An x-y coordinate system is preferably set up in such a way that at the beginning of the evasive maneuver the motor vehicle, in particular its center of gravity, is located at an origin of the xy coordinate system, i.e. parameter x=0 and parameter y=0. In addition, an x axis of the coordinate system is assumed to be oriented parallel to the original longitudinal axis of the motor vehicle, i.e. immediately before the evasive maneuver begins. The evasion trajectory is furthermore assumed not to be curved at the beginning of the maneuver. The initial conditions obtained are thus the following:

$$y(0)=0, y'(0)=0, y''(0)=0.$$

The prime notation (') means here a mathematical derivation by location, where y is a lane offset of the motor vehicle or of the evasion trajectory, y' is an angle of the evasion trajectory with respect to the x axis, and y'' is the curvature of the evasion trajectory at the origin of the coordinate system. At an end of the lane change the motor vehicle is assumed to be offset transversely by an amount equal to $y_E$, to be driving in the same direction as immediately before the beginning of the lane change, and to be located once again on a non-curved trajectory. The final conditions are thus, analogously to the initial conditions:

$$y(x_E)=y_E, y'(x_E)=0, y''(x_E)=0.$$

According to the invention, an evasion trajectory that—assuming the vehicle driver permits it—guides the vehicle safely and the occupants as comfortably as possible is now planned, determined, calculated, or indicated. In other words, in conformity with these boundary conditions, an evasion trajectory that is as comfortable as possible for the occupants is to be planned. A good choice for evaluating driving comfort is the transverse acceleration a of the motor vehicle and of the occupants. It is proposed according to the invention to calculate the evasion trajectory by optimizing transverse-dynamic quality factors J or quality criteria J. A first approach to a transverse-dynamic quality factor J is:

$$J = \int_0^{x_E} a_y^2 dx,$$

where the transverse acceleration a is squared and is integrated over a lane change range [0, $x_E$]. Alternatively, the transverse jerk $\dot{a}_y = da_y/dt$ can also be evaluated analogously, i.e. by squaring and integrating:

$$J = \int_0^{x_E} \dot{a}_y^2 dx.$$

The optimized or optimal solutions of both quality factors J can be adapted, by way of the values $x_E$ and $y_E$ of the boundary conditions, to the distance and width of the obstacle. The optimized solution is obtained in each case by setting up a family of transverse-dynamic quality factors J and searching for a minimum, in particular a global minimum.

An additional adaptation capability should make it possible to advance or shift back the point in time of the switchover to the adjacent lane. This is achieved by introducing path-dependent weightings into the quality factor J, e.g. by exponential weighting as follows:

$$J = \int_0^{x_E} \dot{a}_y^2 e^{\alpha x} dx$$

for the transverse jerk à. The formulation for the transverse acceleration a is correspondingly:

$$J = \int_0^{x_E} a_y^2 e^{\alpha x} dx.$$

The following considerations refer only to the transverse jerk à, but are applicable analogously to the transverse acceleration a.

Figure 2:
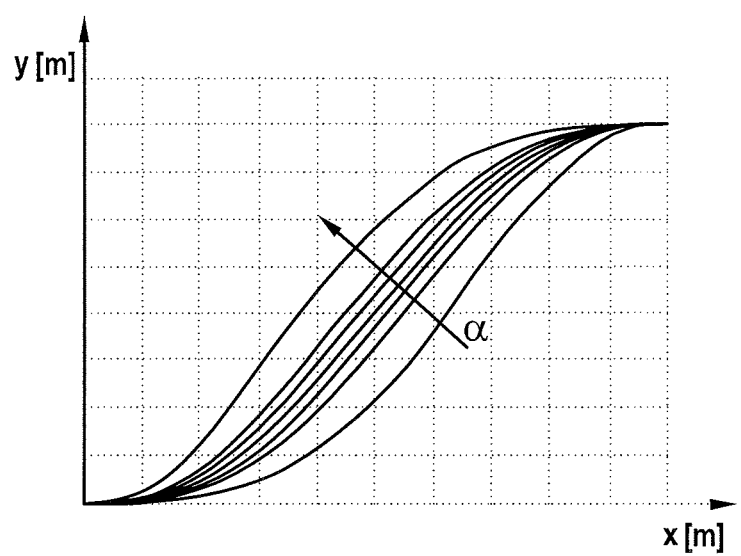
FIG. 2 shows function graphs of optimized evasion trajectories for various values of a weighting parameter with which a point in time of a beginning of the evasive maneuver of the motor vehicle can be influenced.

If the weighting parameter α>0 is selected, values of the transverse jerk a are then more strongly weighted as x increases. In this case the optimization will ensure that the motor vehicle changes lane earlier. The situation is the opposite for α<0. In this case values of the transverse jerk a are more weakly weighted as x increases. This results in a later lane change. FIG. 2 shows the optimum lane change trajectories for a variety of values of the weighting parameter $\alpha(-5/x_E, -2/x_E, -1/x_E, 0, +1/x_E, +2/x_E, +5/x_E)$. According to the invention the lane change point can effectively be shifted forward or backward using α.

For utilization, however, it is cumbersome that a solution in the context of a path-dependent quality factor J is difficult to handle in practice in a formula presentation; this can be circumvented using an approximation solution. It is preferred to develop for this purpose an optimized solution y(x,α) formally in a Taylor series, preferably to the second order with reference to the weighting parameter α:

$$y(x, a) = y(x, 0) + \frac{\partial y}{\partial \alpha}(x, 0)\alpha + \frac{1}{2}\frac{\partial^2 y}{\partial \alpha^2}(x, 0)\alpha^2.$$

The Taylor coefficient can be calculated as:

$$y(x, 0) = y_E \left(\frac{x}{x_E}\right)^3 \left(6\left(\frac{x}{x_E}\right)^2 - 15\frac{x}{x_E} + 10\right),$$

$$\frac{\partial y}{\partial \alpha}(x, 0) = 3x_E y_E \left(\frac{x}{x_E}\right)^3 \left(1 - \frac{x}{x_E}\right)^3,$$

$$\frac{\partial^2 y}{\partial \alpha^2}(x, 0) = \frac{3}{7} x_E^2 y_E \left(\frac{x}{x_E}\right)^3 \left(1 - \frac{x}{x_E}\right)^3 \left(1 - 2\frac{x}{x_E}\right).$$

Figure 3:
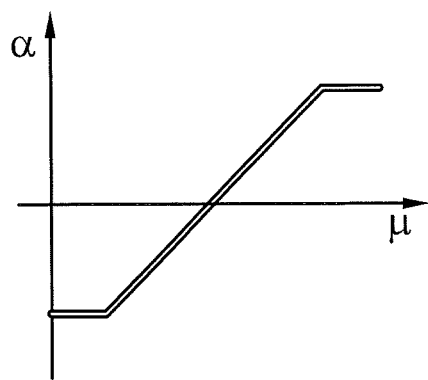
FIG. 3 is a function graph that depicts a correlation between a coefficient of friction that represents a tire/roadway system of the motor vehicle, and the weighting parameter.

It is further proposed according to the invention to adjust the weighting parameter a as a function of the estimated coefficient of friction μ. The physically drivable evasion trajectory depends greatly on the available coefficient of friction μ of a tire/roadway system. With a comparatively low coefficient of friction μ (e.g. on an icy road), the target trajectory, i.e. the optimized evasion trajectory, must be shifted back (later transverse offset); with a comparatively high coefficient of friction (e.g. dry asphalt), the target trajectory can be shifted forward. This results in the following correlation between the coefficient of friction μ and the weighting parameter α: for a small μ, α is negative; for a large coefficient of friction μ, the weighting parameter a becomes positive. The transition therebetween is preferably linear (see FIG. 3).

It is further proposed according to the present invention to adjust the weighting parameter a as a function of a time until a potential collision (time to collision, TTC). The TTC is calculated from a distance to the obstacle $x_{obstacle}$ and the differential speed $\Delta v$:

$$TTC = \frac{x_{obstacle}}{\Delta v}.$$

Figure 4:
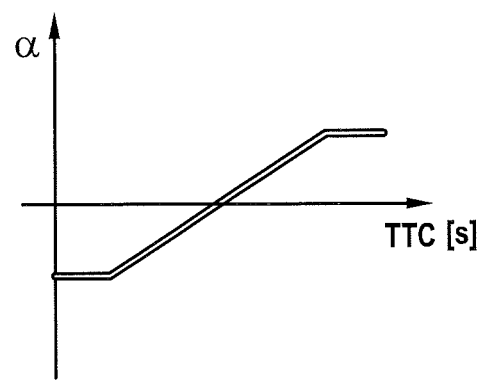
FIG. 4 is a further function graph that depicts a correlation between a time to collision, i.e. a point in time at which the vehicle collides with an obstacle, and the weighting parameter.

The evasion trajectory presented previously (a fifth-order polynomial) has the property that for a comparatively long TTC at the beginning of the evasive maneuver, a comparatively small transverse offset is required. The vehicle driver, on the other hand, typically attempts to immediately generate a comparatively large transverse offset with respect to the obstacle. The target trajectory or evasion trajectory must therefore be shifted forward in time for a comparatively long TTC and backward in time for a comparatively short TTC. The consequence for the weighting parameter cc is that it is positive for a comparatively long TTC and negative for a comparatively short TTC. FIG. 4 illustrates the correlation.

A specific or calculated evasion trajectory can be implemented, for example, using the following control elements: an electric power steering system, a superimposed steering system, a steer-by-wire system, and/or a single-side braking intervention of an ESP.

To carry out a correction intervention for evasion assistance, the following steps are proposed according to the invention (one time after initiation): determine the parameters $x_E$, $y_E$, e.g. from a surroundings sensor suite (e.g. radar, video, lidar), adapt the weighting parameter $\alpha$ to the detected coefficient of friction $\mu$ and/or to the time to collision, and calculate the target trajectory or optimized evasion trajectory.

For a cyclic procedure until the end of the evasive maneuver, the following is (for example) possible. Firstly the current x and y coordinates (zero point=vehicle position at initiation) are determined. This is followed by a calculation of $y_{tgt}$ from the target trajectory $y(x)$ and the current evasion trajectory as a function of a current x coordinate. A correction yaw moment $M_z$ is then determined, as a difference $y_{tgt}-y$. A conversion then occurs of the correction yaw moment $M_z$ into a control application variable, as a function of one or a plurality of control elements. This is, for example, a steering torque in the case of an electric power steering system, a steering angle in the case of a superimposed steering system or a steer-by-wire system, or a braking pressure of the ESP.

Alternatively, for calculation of a correction yaw moment $M_z$ from the difference $y_{tgt}-y$ it is possible to convert a functional presentation $y(x)$ into the curvature/arc length presentation:

$$\kappa = \kappa(s).$$

The curvature $\kappa$ and arc length s are geometric parameters of a plane curve that correlate directly with a vehicle motion. The arc length is obtained by integrating the vehicle speed v, available as an estimated value in the motor vehicle:

$$s(t) = \int_0^t v(t')dt'.$$

If a (target) evasion trajectory is present as $\kappa_{tgt}(s)$, it is then possible to ascertain, from the arc length currently being driven after the beginning of a maneuver, a current target curvature $\kappa_{tgt}$. The target curvature $\kappa_{tgt}$ yields, by multiplication by the vehicle speed v, a yaw rate that can be transferred, as the target yaw rate $\dot{\psi}_{tgt}$, to a downstream vehicle dynamics controller:

$$\dot{\psi}_{tgt} = \kappa_{tgt} v.$$

In the limit case of a low-dynamic vehicle motion with slip angles toward zero, i.e. for $a_y$ approaching zero, a target wheel steering angle $\delta_{tgt}$ can also be calculated for systems that adjust the steering angle (superimposed steering system, steer-by-wire system):

$$\delta_{tgt} = \arctan(L\,\kappa_{tgt}),$$

where L is a wheelbase of the motor vehicle.

The following known equations are used to convert the description of the evasion trajectories from terrestrial coordinates $y(x)$ into the curvature/arc length presentation $\kappa(s)$:

$$s = \int_{x_1}^{x_E} \sqrt{1+y'^2}\,dx,$$

$$\kappa = \frac{y''}{(1+y'^2)^{3/2}}, \text{ where } y' = \frac{dy}{dx},\; y'' = \frac{d^2 y}{dx^2}.$$

Figure 5:
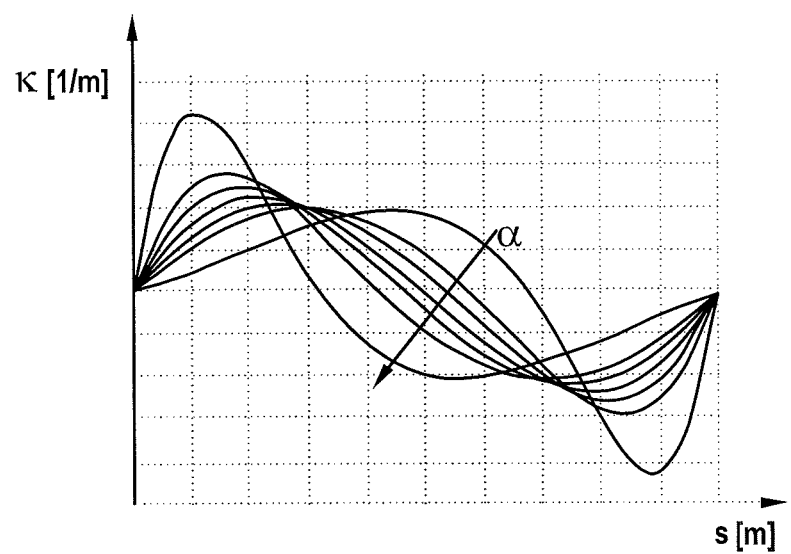
FIG. 5 shows function graphs of the optimized evasion trajectories of FIG. 2 in a curvature/arc length presentation.

FIG. 5 shows the result for the optimized evasion trajectories of FIG. 2.

Furthermore, the method according to the present invention can of course also be carried out using an inverse formulation.

What is claimed is:

1. A method of a motor vehicle system, the method comprising:
   determining, by processing circuitry, an optimized evasion trajectory by optimization of a transverse-dynamic quality factor, wherein the transverse-dynamic quality factor is:
   based on at least one of a transverse acceleration and a transverse jerk of the motor vehicle; and
   exponentially weighted by a path-dependent weighting parameter that shifts a beginning of the optimized evasion trajectory or an actual evasive maneuver either forward or backward in time; and
   performing, by the processing circuitry, at least one of the following:
   outputting the optimized evasion trajectory to a vehicle driver; and
   partially adapting a trajectory of the motor vehicle to the optimized evasion trajectory.

2. The method as recited in claim 1, further comprising:
   determining a plurality of transverse-dynamic quality factors for a family of evasion trajectories, wherein the optimized evasion trajectory is characterized by a minimum of the determined transverse-dynamic quality factors.

3. The method as recited in claim 1, wherein the method is carried out using a mathematical approximation solution, an optimized solution being developed formally in a Taylor series.

4. The method as recited in claim 1, further comprising:
   adjusting the weighting parameter as a function of a coefficient of friction between a tire/roadway system, the optimized evasion trajectory being shifted back in time for a comparatively low coefficient of friction and shifted forward in time for a comparatively high coefficient of friction.

5. The method as recited in claim 1, further comprising:
   adjusting the weighting parameter as a function of a time until a potential collision; and
   calculating a time until the potential collision from a distance to an obstacle and from a differential speed between the motor vehicle and the obstacle.

6. The method as recited in claim 1, further comprising:
firstly determining target position parameters of the motor vehicle; and
subsequently adapting the weighting parameter to at least one of a coefficient of friction and a time until a potential collision, a calculation of the optimized evasion trajectory occurring subsequently thereto in time.

7. The method as recited in claim 1, further comprising:
firstly determining a current vehicle position; and
subsequently thereto in time performing a calculation of a target position of the motor vehicle from one of the evasion trajectory and a current evasion trajectory;
subsequently thereto in time determining a correction yaw torque; and
converting the correction yaw torque into a control application variable for the motor vehicle.

8. The method as recited in claim 1, wherein the motor vehicle system includes at least one of a lane change assistance system and an evasion assistance system.

9. The method as recited in claim 2, wherein the minimum is a global minimum.

10. The method as recited in claim 3, wherein the Taylor series is a second-order Taylor series.

11. The method as recited in claim 1, wherein the motor vehicle system is a driver assistance system and the method is performed in order to enhance at least one of active safety and passive safety in road traffic.

12. A motor vehicle system, comprising:
processing circuitry for executing a method, the method comprising:
    determining an optimized evasion trajectory by optimization of a transverse-dynamic quality factor; and
    at least one of outputting to a vehicle driver, and partially adapting a trajectory of the motor vehicle to, the optimized evasion trajectory;
wherein the transverse-dynamic quality factor is:
    based on at least one of a transverse acceleration and a transverse jerk of the motor vehicle; and
    exponentially weighted by a path-dependent weighting parameter that shifts a beginning of the optimized evasion trajectory or an actual evasive maneuver either forward or backward in time.

13. The motor vehicle system as recited in claim 12, wherein the motor vehicle system includes at least one of a lane change assistance system and an evasion assistance system.

14. The motor vehicle system as recited in claim 12, wherein the motor vehicle system is a driver assistance system and the method is performed in order to enhance at least one of active safety and passive safety in road traffic.

* * * * *